United States Patent [19]

Patterson

[11] Patent Number: 5,154,792
[45] Date of Patent: Oct. 13, 1992

[54] BONDING METHOD EMPLOYING URETHANE ADHESIVES HAVING GOOD HEAT TRANSFER PROPERTIES

[75] Inventor: Jimmy L. Patterson, Trenton, Mich.

[73] Assignee: BASF Corporation, Parsippany, N.J.

[21] Appl. No.: 635,081

[22] Filed: Dec. 28, 1990

[51] Int. Cl.$^5$ ............................................... C09J 5/02
[52] U.S. Cl. ................................. 156/307.3; 62/465; 156/293; 156/331.4; 165/178; 252/75; 312/236; 524/450
[58] Field of Search ............... 156/307.3, 331.4, 293; 252/75; 524/450; 312/236; 62/465; 165/178

[56] References Cited

U.S. PATENT DOCUMENTS 3,755,222  8/1973  Grubber et al. .................... 524/450
4,251,428  2/1981  Recker et al. ...................... 524/450

Primary Examiner—John J. Gallagher
Attorney, Agent, or Firm—Martin P. Connaughton

[57] ABSTRACT

The invention relates to urethane polymers exhibiting excellent heat transfer properties. Specifically these polymers are used as adhesives for the purpose of adhering cooling/condensing tubes to metal panels for the manufacture of freezer and refrigerator cabinets.

7 Claims, 1 Drawing Sheet

BONDING METHOD EMPLOYING URETHANE ADHESIVES HAVING GOOD HEAT TRANSFER PROPERTIES

FIELD OF THE INVENTION

The invention is related to polyurethane adhesives which may be used in applications which of necessity dictate the use of materials having good heat transfer properties, compatibility with foam insulation, and a relative insensitivity to temperature changes between −20° F. and 230° F.

BACKGROUND OF THE INVENTION

Urethane adhesives are known in the art. U.S. Pat. No. 4,318,837 describes a urethane adhesive composition consisting of 100 parts of a saturated polyester and 5 to 150 parts of unsaturated a polyester containing 5 to 15 parts of an organic polyisocyanate, which is suitable for adhering wood to vinyl film. U.S. Pat. No. 4,323,491 discloses a urethane adhesive composition comprising a prepolymer of polydiethylene glycol adipate and tolylene diisocyanate, polyisocyanate, trichloroethylphosphate, and a mixture of water, urea, and sodium sulphoricinate, the object being to upgrade the strength of an adhesive joint at negative temperatures and reduce the reactive volatile components in the adhesive composition. U.S. Pat. No. 4,698,408 discloses a two component adhesive system comprising a mixture of an isocyanate prepolymer and a polyepoxide and a mixture of a polyol, a urethane curing catalyst and an epoxy curing catalyst, the stated advantages of such a system being significantly improved high temperature thermal stability and immediate nonsagging behavior. U.S. Pat. No. 4,748,781 describes a method of bonding structural support channels to a panel using a polyurethane adhesive foam which among other advantages provides resistance to heat flow.

BRIEF SUMMARY OF THE INVENTION

This invention relates to a urethane adhesive. More particularly this invention relates to a urethane adhesive which has good heat transfer properties and thermal stability between about −20° F. and about 230° F., and a method of bonding cooling/condensing coils or tubes to metal walls of a refrigerator.

DETAILED DESCRIPTION OF THE INVENTION

Figure 1:
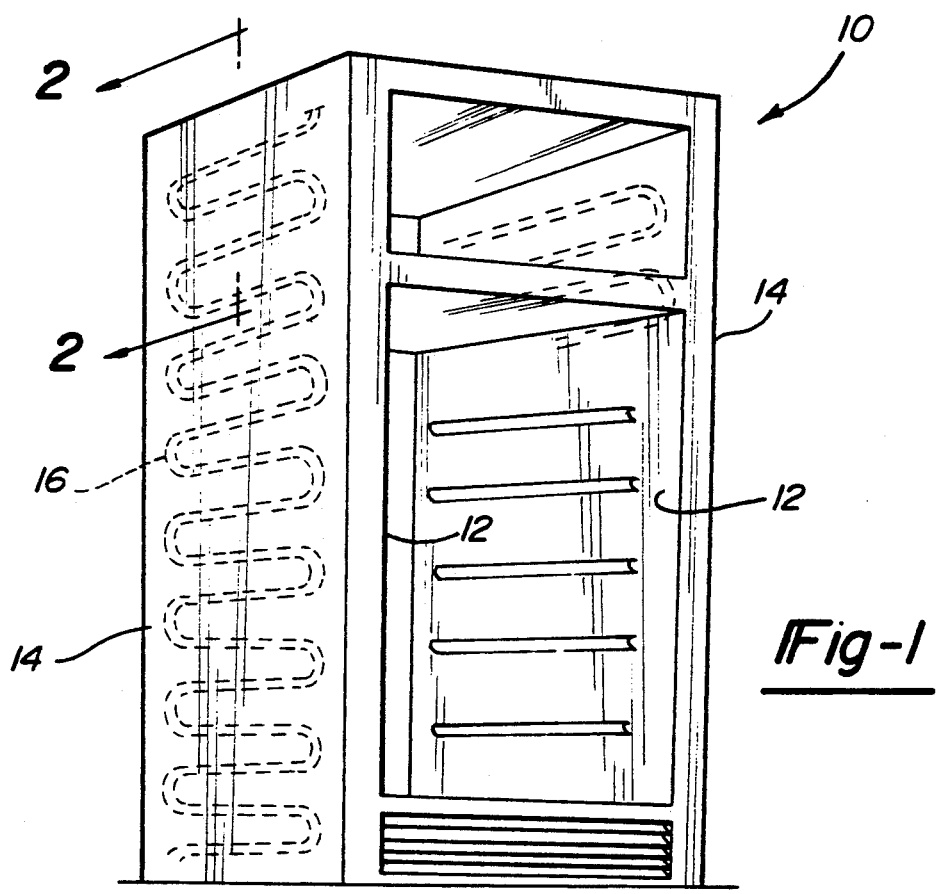

Referring now to the drawings, FIG. 1 illustrates a general structural diagram of a refrigeration cabinet 10 as described in the present invention having an outer cabinet 14, and an inner wall 12. Attached to the inside wall of the outer cabinet 14 are the condensing coils 16.

Figure 2:
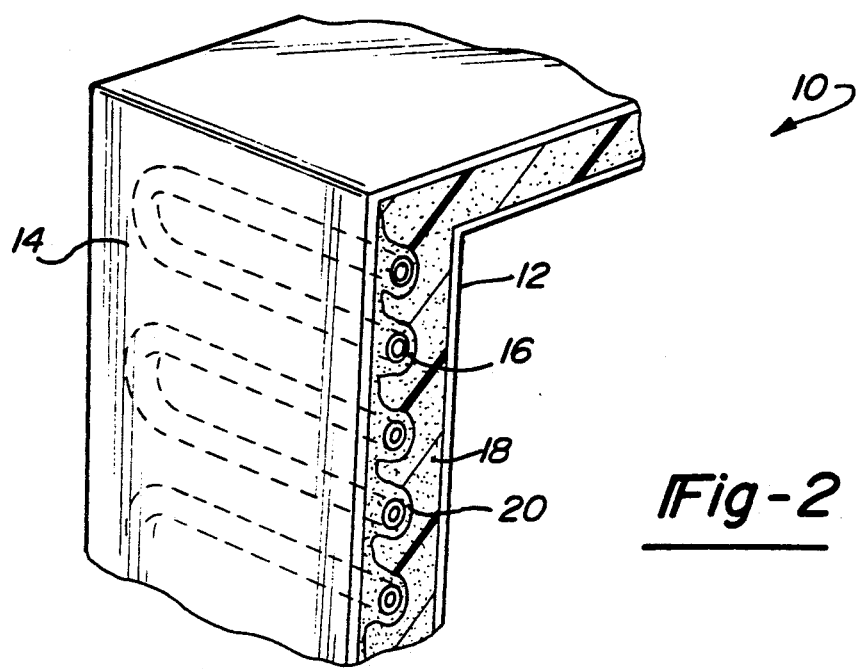

Referring now to FIG. 2, a cut-away view of the refrigeration cabinet 10. The condensing coils 16 are attached to the outer cabinet 14 by the urethane adhesive 20 which comes in intimate contact with both the outer cabinet 14 and the insulating urethane foam 18.

Today's changes and advances in refrigerator design have necessitated the development of an improved means of fastening cooling/condensing coils or tubes to surfaces within the cabinet of the refrigeration unit itself. Previously the condensing coils were located at the rear of the cabinet on the outside. New designs attach the condensing coils along the inside wall of the outer cabinet. The coils are between the cabinet wall and the insulating urethane foam. This design requires a means of attachment which will provide as little impediment to heat transfer between the coils and the cabinet as possible. Furthermore, the means of attachment must be compatible with the insulating foam and exhibit good thermal stability between about −20° F. and about 230° F. Adhesives currently used for freezer cabinets are materials that have poor temperature stability and retard heat flow. The urethane adhesives of the present invention display good adhesion at high and low temperatures, good heat transfer properties and are compatible with present urethane insulating foams.

The adhesives used in the present invention are prepared using known techniques. Isocyanates are reacted with a polyol-containing resin in the presence of a catalyst. The adhesive formulation itself, comprises;

a) a polyol selected from the group comprising polyoxyethylene/polyoxpropylene block copolymers, polyoxypropylene adducts of an alkylene radical having at least two isocyanate reactive hydrogens, a polyethylene terephthalate based aromatic polyester polyol or mixtures thereof, b) an isocyanate in which all the isocyanate groups are aromatically bound, c) a water scavenger, d) a catalyst capable of promoting urethane formation, and e) optionally a chain extender and plasticizer.

Suitable polyoxyethylene/polyoxpropylene copolymers and polyoxypropylene adducts are polyether polyols having a functionality of at least two. These polyether polyols are produced in accordance with well known methods by reacting one or more alkylene oxides with 2 to 4 carbon atoms in the alkylene radical with initiator molecules containing from 2 to 8 reactive hydrogen atoms. Suitable alkylene oxides include ethylene oxide, propylene oxide, and butylene oxide. Initiator molecules are ethylene glycol, diethylene glycol, propylene glycol, dipropylene glycol, trimethylene glycol, 1,2-butane diol, 1,3-butane diol, 1,4-butane diol, 1,2-pentane diol, 1,4-pentane diol, 1,5-pentane diol, 1,6-hexane diol, 1,7-heptane diol, glycerol, 1,1,1-trimethyol propane, 1,1,1-trimethyol ethane, 1,2,6-hexane triol, o-methyl glucoside, pentaerythritol, sorbitol, and sucrose. Other initiator molecules include amines such as trialkanolamine, triethanolamine, triisopropanolamine, aliphatic, cycloaliphatic and aromatic diamines with 2 to 15 carbon atoms such as ethylene diamine, 1,3-propanediamine, propylene diamine 1,4-butanediamine, 1,6-hexamethylenediamine, 1,4-diaminocyclohexane, 4,4'-2,4' and 2,2'-diaminodiphenylmethane.

The polyethylene terephthalate based aromatic polyester polyols used in the instant invention may be obtained from a variety of waste materials, such as used photographic films, X-ray films, and the like; synthetic fibers and waste materials generated during their manufacture; used plastic bottles and containers such as the soft plastic beverage containers now widely used by the soft drink industry; and waste materials from the production of other products made from polyalkylene terephthalate polymers. These waste materials are digested and reacted with suitable polyols. The complete method for preparing these polyester polyols is disclosed in U.S. Pat. No. 4,701,477 which is incorporated herein by reference.

Suitable isocyanates include those in which the isocyanate groups are aromatically bound. Representatives of these types of isocyanates includes, 2,4-toluene diisocyanate, 2,6-toluene diisocyanate, mixtures of 2,4- and 2,6-toluene diisocyanate, naphthalene-1,5-diisocyanate, 1-methoxyphenyl-2,4-diisocyanate, 4,4'-diphenylmethane diisocyanate (MDI), 2,4'-diphenylmethane diisocyanate (MDI), mixtures of 4,4'-biphenyl diisocyanate, 3,3'-dimethyl-4,4'-biphenyl diisocyanate, 3,3'-dimethyl-4,4'-biphenyl diisocyanate and 3,3'-dimethyldiphenyl methane-4,4'-diisocyanate; and polymeric polyisocyanates such as polymethylene polyphenylenes polyisocyanates (polymeric MDI). Included within the useable isocyanates are those modifications containing carbodiimide, allophonate, urethane or isocyanurate structures. Unmodified polymeric MDI and mixtures of polymeric MDI and pure 2,4 and 4,4' MDI and carbodiimide modified MDI are preferred. These polyisocyanates are prepared by conventional methods known in the art, e.g. phosgenation of the corresponding organic amine.

Water scavengers are a necessary part of the invention. Suitable scavengers include molecular sieves and zeolites. Zeolites are preferred. The zeolites used in the present invention are crystalline aluminosilicates, composed of silica and alumina in various proportions plus metallic oxides. They are produced by hydrothermal treatment of a solid aluminosilicate or of a gel obtained by the reaction of sodium hydroxide, alumina hydrate and sodium silicate. The initially obtained product, or a naturally occurring analog, may be partially ion-exchanged to introduce other cations. The preferred zeolites of the present invention are potassium analogs in the form of a paste with the carrier being castor oil. Baylith Paste and Zeolite Paste are examples of the preferred zeolite.

Any suitable catalyst or mixture of catalysts may be used including tertiary amines such as for example, triethylenediamine, N-methylmorpholine, N-ethylmorpholine, diethylethanolamine, N-cocomorpholine, 1-methyl-4-dimethylaminoethylpiperazine, 3-methoxypropyldimethylamine, N,N,N-trimethylisopropyl propylenediamine, 3-diethylamino-propyldiethylamine, dimethylbenzylamine, and the like. Other suitable catalysts are, for example, stannous chloride, dibutyltin-di-2-ethyl hexonate, potassium hexanoate, stannous oxide, as well as other organometallic compounds such as are disclosed in U.S. Pat. No. 2,846,408.

Chain extending agents which may be employed in the preparation of the polyurethane adhesives include those compounds having at least two functional groups bearing active hydrogen atoms such as, hydrazine, primary and secondary diamines, amino alcohols, amine acids, hydroxy acids, glycols, or mixtures thereof. A preferred chain extender when used is ethylene glycol.

Other optional additives which fall within the spirit of the present invention included stabilizers against aging and weathering, fillers, and plasticizers. Plasticizers used in the present invention include castor oil and its derivatives, e.g. methyl ricinoleate.

The following illustrates the nature of the invention. All parts are by weight unless otherwise indicated.

| | |
|---|---|
| Polyol A | is a polyoxyethylene/polyoxypropylene block copolymer having a molecular weight of about 2000. |
| Polyol B | is a polyoxypropylene adduct of propylene glycol having a molecular weight of about 1040. |
| Polyol C | is a polyethylene terephthalate based aromatic polyester polyol having an equivalent weight of about 160. |
| Polyol D | is a polyethylene terephthalate based aromatic polyester polyol having a equivalent weight of about 144. |
| Baylithe Paste | is a Zeolite Paste sold by Mobay. |
| Zeolite Paste | is a Zeolite Paste sold by EM Scientific. |
| DABCO 33LV | is an amine catalyst sold by Air Products. |
| T-12 | is a tin catalyst sold by Air Products. |
| Castor Oil | is a plasticizer. |
| ISO A | is a polymethylene polyphenylisocyanate having a functionality of about 27. |
| ISO B | is a mixture of polymethylene polyphenyl isocyanate containing minor amounts of a carbodimide modified 4,4'-diphenylmethane diisocyanate, and 2,4- and 4,4'-diphenylmethane diisocyanate. |

TABLE 1

| Resin | 1 | 2 | 3 |
|---|---|---|---|
| Polyol A | 50.0 | 10.0 | — |
| Polyol B | — | — | 10.0 |
| Polyol C | — | 63.0 | — |
| Polyol D | — | 27.0 | — |
| Ethylene Glycol | — | — | 5.0 |
| Baylithe Paste | 0.4 | 2.0 | — |
| Zeolite Paste | — | — | 2.0 |
| DABCO 33LV | 1.0 | 1.0 | — |
| T-12 | — | — | 0.1 |
| Castor Oil | — | — | 20.0 |
| Isocyanate | | | |
| ISO A | — | 100.0 | 51.7 |
| ISO B | 10.0 | — | — |

All samples were prepared in like manner. Initially, the resin components were thoroughly mixed at room temperature. The isocyanate was added to the resin and mixed. The adhesive composition was at that point was a flowable liquid.

All samples cured to a hard, impact resistant tack-free state. Sample 1 in Table 1 was tested to determine thermal conductivity (ASTM C518) and softening temperature (ASTM D1525). Sample 1 exhibited excellent heat transfer capabilities with a reported K-factor of 1.033. It also exhibited no sag up to 200° F.

Polyethylene terephthalate based aromatic esters were added to the resin component in example 2. This addition resulted in a very hard polymer which had increased temperature resistance, exhibiting no sag to about 230° F. (ASTM D1525). Example 3 contained no polyester, but had a plasticizer added. The heat transfer characteristics (K-factor 0.765, ASTM C518), were less than example 1 however the adhesive when cured was not as hard.

The embodiments of the invention in which exclusive property is claimed are:

1. A method of joining cooling and condensing tubes to a metal panel, which comprises:
a) forming an assembly comprising the tubes and the metal panel having therebetween a sufficient bonding amount of an adhesive exhibiting heat transfer properties and thermal stability, and
b) curing the adhesives wherein the adhesive comprises:
i) a polyol selected from the group comprising; polyether polyols, polyester polyols, and mixtures thereof,
ii) an isocyanate in which all the isocyanate groups are aromatically bound,
iii) a water scavenger,
iv) a catalyst capable of promoting urethane formation, and
v) optionally a chain extender and a plasticizer, wherein the adhesive has a heat transfer coefficient no less than 0.765 and exhibits no sag to temperatures of about 230° F.

2. A method as claimed in claim 1 wherein the polyether polyols are selected from the group comprising polyoxyethylene/polyoxypropylene block copolymers and polyoxypropylene adducts of an alkylene radical having at least two isocyanate reactive hydrogens.

3. A method as claimed in claim 1, wherein the polyester is a polyethylene terephthalate based aromatic polyester polyol.

4. A method as claimed in claim 1, wherein the polyol is a mixture of a polyoxyethylene/polyoxypropylene block copolymer and a polyethylene terephthalate based aromatic polyester polyol.

5. A method as claimed in claim 1, wherein the isocyanate is a polymethylene polyphenylisocyanate or a polymethylene polyphenylisocyanate containing minor amounts of a carbodimide modified 4,4'-diphenylmethane diisocyanate, and 2,4-and 4,4'-diphenylmethane diisocyanate.

6. A method as claimed in claim 1, wherein the adhesive has a heat transfer coefficient of about 1 or more.

7. A method as claimed in claim 1, wherein the water scavenger is a zeolite.

* * * * *